US008821296B1

(12) United States Patent
Smurfit et al.

(10) Patent No.: US 8,821,296 B1
(45) Date of Patent: Sep. 2, 2014

(54) NETWORK GAMING SYSTEM AND CASINO MANAGEMENT SYSTEM LINK

(71) Applicant: GameAccount Network, London (GB)

(72) Inventors: Dermot S. Smurfit, London (GB); Simon R. Knock, London (GB)

(73) Assignee: GameAccount Network PLC, London (GB)

( * ) Notice: Subject to any disclaimer, the term of this patent is extended or adjusted under 35 U.S.C. 154(b) by 0 days.

(21) Appl. No.: 13/973,910

(22) Filed: Aug. 22, 2013

Related U.S. Application Data

(60) Provisional application No. 61/816,125, filed on Apr. 25, 2013.

(51) Int. Cl.
*G06F 17/00* (2006.01)

(52) U.S. Cl.
USPC .......................................................... 463/42

(58) Field of Classification Search
USPC ........................................ 463/16–25, 40–42
See application file for complete search history.

(56) References Cited

U.S. PATENT DOCUMENTS

| | | | | |
|---|---|---|---|---|
| 8,187,087 B2 * | 5/2012 | Herrmann et al. | .............. | 463/25 |
| 8,192,289 B2 * | 6/2012 | Herrmann et al. | .............. | 463/42 |
| 8,246,466 B2 * | 8/2012 | Herrmann et al. | .............. | 463/42 |
| 2009/0029766 A1 * | 1/2009 | Lutnick et al. | .................. | 463/29 |

* cited by examiner

*Primary Examiner* — Ronald Laneau
(74) *Attorney, Agent, or Firm* — Lewis Roca Rothgerber LLP

(57) ABSTRACT

A network (e.g., Internet) based gaming system and one or more casino management systems (CMS) are connected to manage patron data, loyalty programs, and other data. The connection may be implemented as an abstracted integration. As such, the connection mechanism may be used to connect the network based gaming system to a variety of proprietary and other CMS types. The connection mechanism may be synchronous, such as for example via a web service using XML over SOAP, or asynchronous, such as for example using a message sender/listener system such as system-2-system (S2S).

20 Claims, 9 Drawing Sheets

FIGURE 7
Jugar debe ser siempre entretenido. Si no, no sería jugar.
¿Tienes dudas? Contacta con nosotros
Ayuda
enracha
edenracha001
DEPOSITAR
Salir
Inicio
Casino
Habilidad
Baraja Española
Máquinas de Azar
Promos
Noticias
Clubs
MI CUENTA
Desglose
Depositar
Retirar
Historial
Historial de torneos
Historial de juegos
Datos Personales
Limite Personal
Cambiar contraseña
Saldo total:
€70.00
Bono:
€0.00
Puntos:
1000,00
En juego:
€0.00
Saldo disponible:
€70.00
RETIRAR
DEPOSITAR
Navegación
Nosotros
Contacto
Normas

NETWORK GAMING SYSTEM AND CASINO MANAGEMENT SYSTEM LINK

CROSS-REFERENCE TO RELATED APPLICATIONS

This application claims the priority benefit of U.S. Provisional Application Ser. No. 61/816,125, titled "Network Gaming System and Casino Management System Link," filed Apr. 25, 2013, the disclosure of which is incorporated herein by reference.

BACKGROUND

Casinos have existed for decades and are very popular. Casinos typically offer games of chance for patrons who wish to gamble. Often times, casinos may offer a reward or loyalty program to patrons. As a patron spends more money at a casino, that casino may offer points, perks, or other credits to the patron. Casino loyalty programs are typically managed by an offline system that tracks where a user has been, what a user has done, and the credits available to the user.

Online gaming has gained in popularity in recent years. Online gaming allows users in many locations to participate in gaming in an online environment. Each user may login to the online service, access their user account, and participate in the online gaming provided by a particular service provider.

Casino loyalty programs and online gaming services are two separate entities with no way to communicate with each other. They are typically owned and operated by separate entities. What is needed is an improved manner for enjoying a combined online gaming experience and an offline casino loyalty program.

SUMMARY

The present technology connects a network (e.g., Internet) based gaming system and one or more casino management systems (CMS) for managing patron data, loyalty programs, and other data. The connection may be implemented as an abstracted integration. As such, the connection mechanism may be used to connect the network based gaming system to a variety of proprietary and other CMS types. The connection mechanism may be synchronous, such as for example via a web service using XML over SOAP, or asynchronous, such as for example using a message sender/listener system such as system-2-system (S2S).

In an embodiment, a method may for communicating player information may begin with accessing user login information for an online gaming service. Patron account information may be accessed from a casino loyalty system. The patron may be associated with the user. Information may be communicated between a server providing the online gaming service and a device associated with the casino loyalty system.

A system for communicating player information may include a server, a management system and one or more modules. The server may provide a web-based gaming service to a first player. The server may have access to a first account associated with the web-based gaming service for the first player. The management system may manage a reward for the first player and may be associated with a gaming facility. The management system may have access to a second account associated with the management system for the first player. The one or more modules may be stored on a second server and executed by a processor to communicate data between the first server and the management system.

DETAILED DESCRIPTION

The present technology connects a network based gaming system and one or more casino management systems (CMS) for managing patron data, loyalty programs, and other data. The connection may be implemented as an abstracted integration. As such, the connection may be used to connect the network based gaming system to a variety of proprietary and other CMS types. The connection mechanism may be synchronous, such as for example via a web service using XML over SOAP, or asynchronous, such as for example using a message sender/listener system such as system-2-system (S2S).

The connection mechanism may utilize a persistent message store and queue technology, such as for example Apache ActiveMQ, to guarantee delivery to third party CMS systems. A proprietary integration may be utilized to handle the triggering of messages to a remote system and caching of responses, so that the solution is scalable and the results are available to any applications providing the network service.

Figure 1:
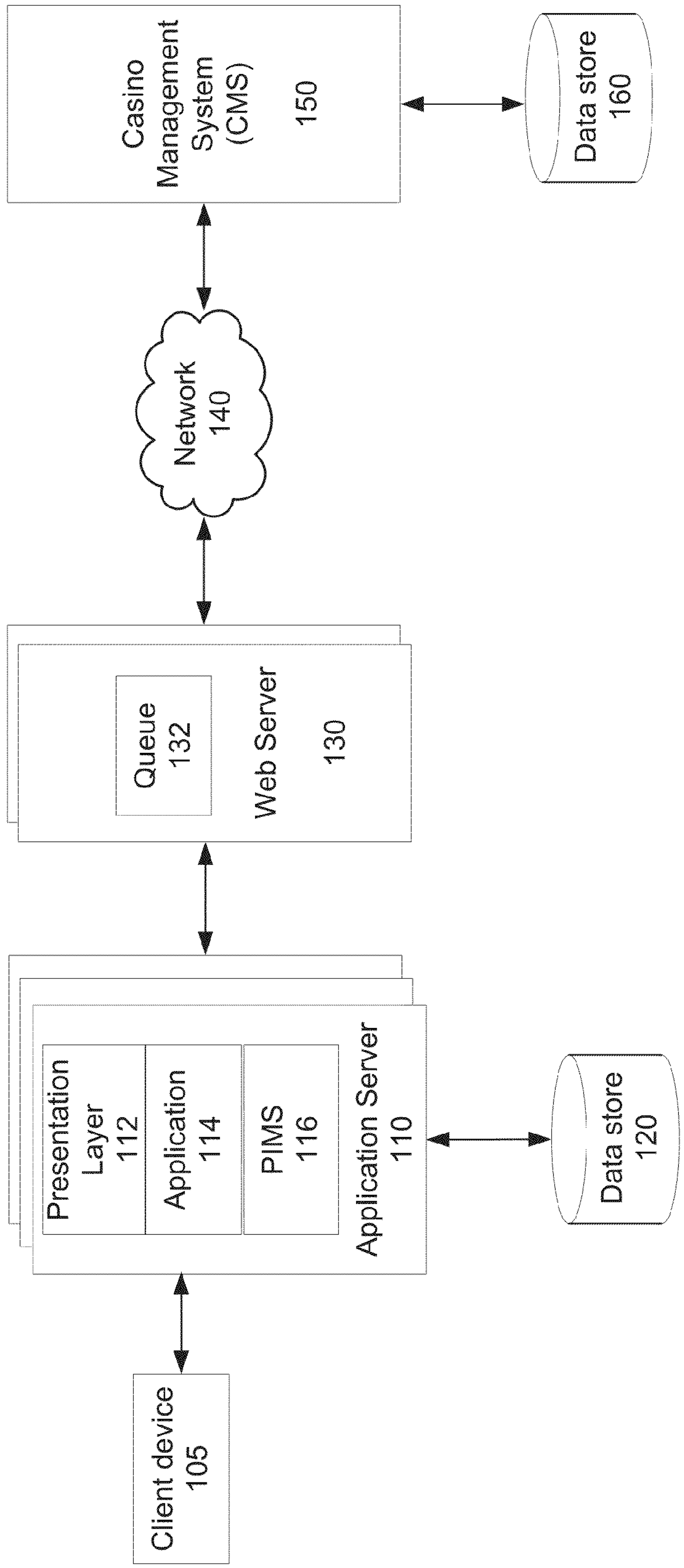
FIG. 1 illustrates a system for linking a network gaming service to a casino management system.

The system may be used with a queuing mechanism so that, optionally, the system can be operated without the CMS needing to be online and available. The data may be queued and synchronized when the CMS becomes available FIG. 1 illustrates a system for linking a network gaming service to a casino management system. The system of FIG. 1 includes application servers 110, data store 120, web server 130, network 140, casino management system 150, and data store 160. Application server 110 may include one or more executable modules which implement presentation layer 112, applications 114, and partner integration management system (PIMS) 116.

Presentation layer 112 may provide content such as web pages over the Internet or other networks. The web pages may provide information to a user, for example through a web browser, and receive information from the user. A user at client device 105 may access the network service provided by application server 110 through a web page rendered at a web browser at client device 105.

Data store 120 may store data for users having an account with the web service provided by application servers 110. The user account fields may include username, email, login information such as password, first and last name, birth date, address, city and state, promotional code information, phone number, marketing information, loyalty credit information, and other data. The user account may also include a user identifier for use by the web service, and may include a patron account identifier for referencing a corresponding patron account for the same individual with CMS 150.

Applications 114 may include one or more modules which implement logic connecting the web-based network service of application server 110 and the land based system of CMS 150. The logic may include accessing, managing and modifying a user account associated with the web based service, or accessing, managing and modifying a patron account associated with the land based service provided by CMS 150.

PIMS 116 may generate requests to be sent to a particular CMS associated with a particular user. For example, applications 114 may request that PIMS 116 retrieve patron account information, access loyalty credits, or perform other actions with respect to CMS 150. PIMS 116 may receive the abstract request from application 114, determine the communication preference of the particular CMS associated with the user associated with the request, and instruct web server 130 to submit a request to the CMS associated with the user of the web service.

Web server 130 may be implemented as one or more machines configured to send and receive messages over the Internet or other network (collectively displayed as network 140). The messages to transmit (and received messages) may be provided by PIMS 116 via an SSL connection, VPN or other connection.

Web server 130 may include queue 132. Messages to be sent to CMS 150 may be queued in queue 132 before they are sent over network 140 to CMS 150. In some embodiments, if a CMS 150 is not available, a message to be sent may be stored in queue 132 until the CMS is determined to be available.

Network 140 may be implemented as the Internet. In embodiments, network 140 may be implemented as one or more private networks, public network, local area networks, wide area networks, the Internet, an intranet, a wireless network, a cellular network, and/or a combination of these networks.

CMS 150 may implement a management system for a land-based casino or other gaming facility. CMS 150 may implement and provide communications between different aspects of the casino, such as gaming machines, accounting, reservations, patron account creation and management, and other casino operations. Examples of different types of CMS communications are discussed in more detail below with respect to FIGS. 2-3.

Data store 180 may store data for patrons having an account with the land-based casino associated with CMS 150. Each patron account may include fields for a patron of the casino. The patron account fields may include username, email, login information such as password, first and last name, birth date, address, city and state, promotional code information, phone number, marketing information, loyalty credit information, and other data. The patron account may include a patron account identifier, as well as a user account number for an individual's account with the web based gaming service.

The mechanism for linking a web-based system and land-based casino system is extensible, and may include functionality such as creating patron accounts for a land-based CMS, retrieving patron information from land-based CMS, querying loyalty points for a patron, merging multiple patron records in the internet-based system once notified by CMS, and updating patrons in the internet-based system and CMS.

In some embodiments, an exemplary workflow of the present technology may proceed as follows. A customer may register online via the internet-based system. The system may then look up the customer in the CMS via the present technology. If they already exist, a patron number will be returned and tagged to the player in the internet-based system. If the player does not exist in the CMS that matches the received registration information, a new patron is created and a new patron ID is returned to the internet-based system.

In embodiments, the CMS may transmit the internet-based system a list of all player accounts which it considers to be duplicates and require merging. The internet-based system will keep a backup of these patrons and merge them together based on the CMS instructions. The merging may occur based on an event or request, or occur periodically, such as twice a day.

In embodiments, upon login, if a player has an existing CMS Patron ID (e.g., has an account with a land-based casino), the internet-based system will request the current loyalty points balance for the player. This will be then be returned and cached by the internet-based system and shown on Account Management/Balance pages for the player.

Figure 2:
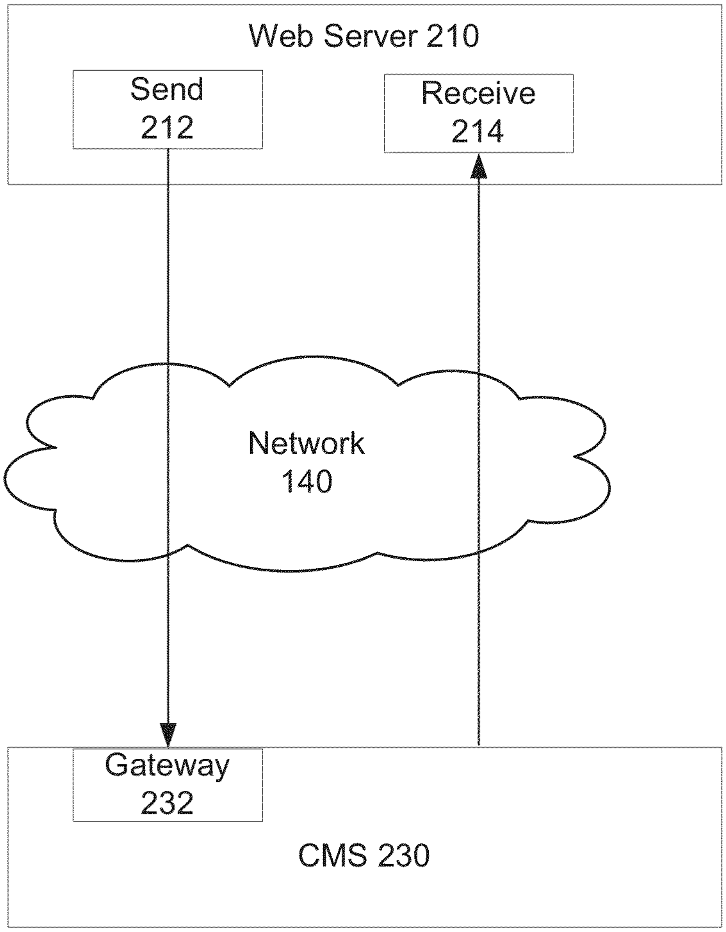
FIG. 2 illustrates a system for providing asynchronous communication between a network gaming system and a casino management system.

FIG. 2 illustrates a system for providing asynchronous communication between a network gaming system and a casino management system. Web server 210, which may be part of the web-based gaming system of FIG. 1 (e.g., web server 130), may communicate asynchronously with CMS 230 over network 140, which may be implemented as the Internet. Web server 210 may include a send module 212 and a receive module 214. Send module 212 may be implemented as one or more executable modules for transmitting a message to a CMS 230. A message may be transmitted by send module 212 over the Internet via a transport mechanism such as XML. In embodiments, each message may be transmitted to gateway 232. The gateway may receive communications in the form of an S2S protocol.

CMS 2230 may send messages to receive module 214. The messages sent to receive module 214 may be sent asynchronously with respect to send module 212. For example, send module 212 may transmit a request to gateway 232 of CMS 230. Subsequently, CMS may send a message to receive module 214 without any reference to the received message. As such, receive module 214 may 'listen' for incoming messages as a service implemented separately from the message transmission service provided by send module 212.

Figure 3:
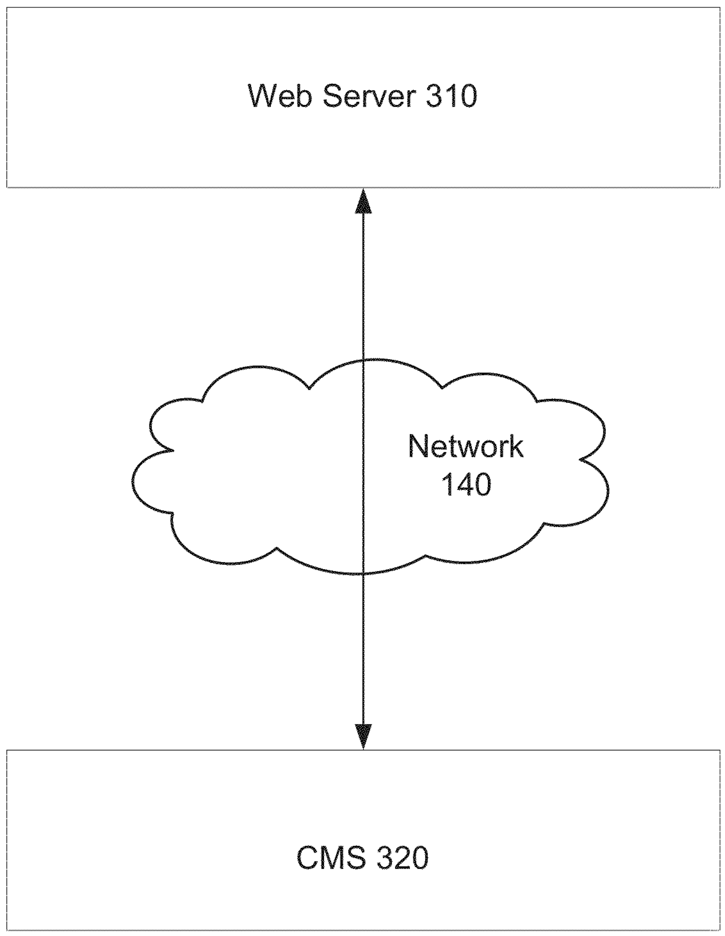
FIG. 3 illustrates a system for providing synchronous communication between a network gaming system and a casino management system.

FIG. 3 illustrates a system for providing synchronous communication between a network gaming system and a casino management system. FIG. 3 includes a web server 310 and a CMS 320 communicating over network 140, which may be implemented as the Internet. The web service may be coded in WSDL and may form a connection with CMS 320 using an SSL connection, VPN connection, or other connection. The messages transmitted between web server 310 and CMS 320 are synchronized, such that for each request transmitted a corresponding response is transmitted in return. The messages may be sent in SOAP, XML and HTTP protocols.

Figure 4:
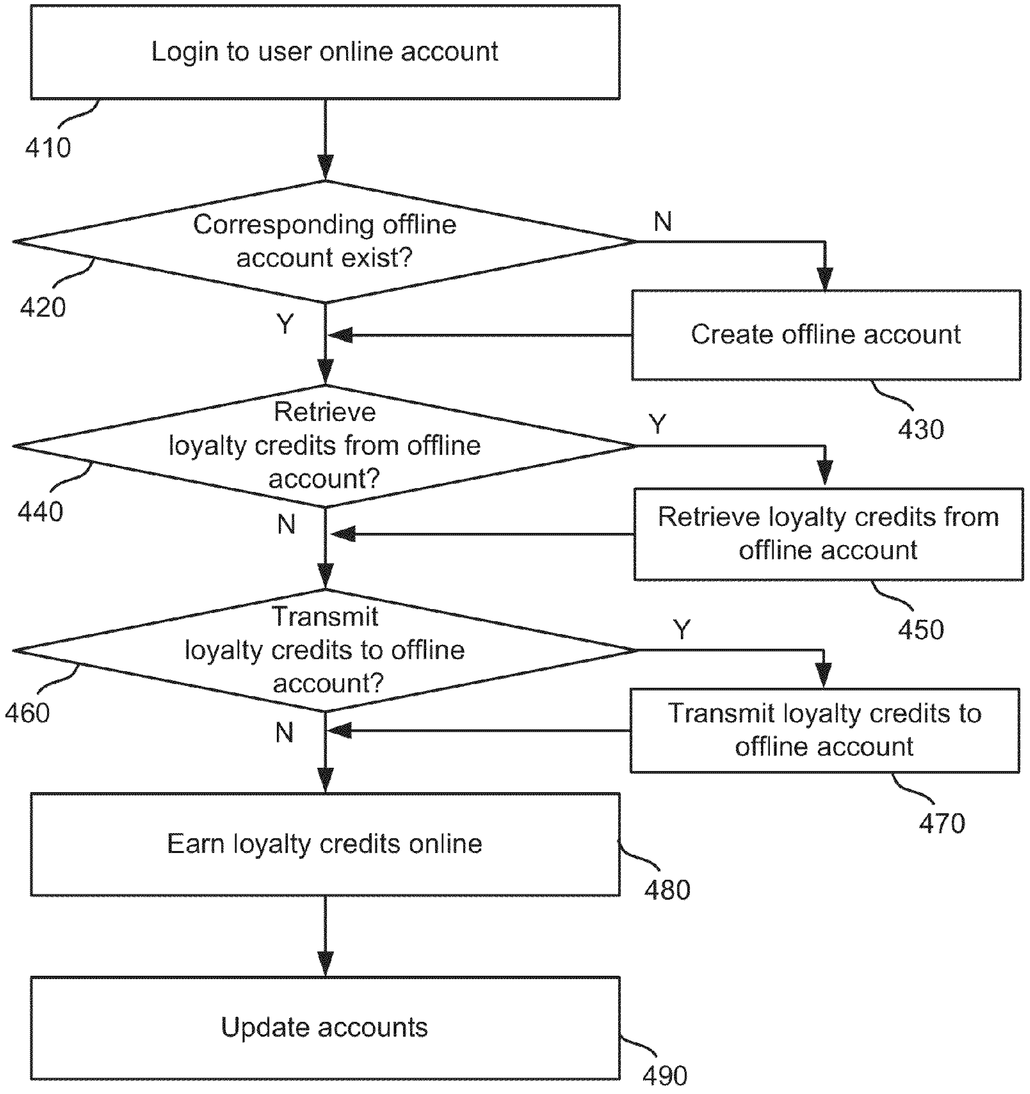
FIG. 4 is a method for accessing an offline loyalty program from an online gaming account.

FIG. 4 is a method for accessing an offline loyalty program from an online gaming account. The method of FIG. 4 may be implemented by one or more applications on an application server such as application server 110. A user may login to an online account at step 410. User login may include providing a username and password through a computing device, which transmits the received login information to a remote server. The remote server may confirm the login information matches stored login information (or create a new account for the user) and provide an online gaming service to the user.

A determination may be made as to whether an offline account exists for the user at step 420. For example, the online service may prompt the user to provide input to the online service with login information for the offline service, such as a patron identifier, username or password. If the user does have an offline account with a casino, the user login information for the offline casino is received from the user and the method continues to step 460. If the user does not have an offline account with a particular casino, a patron account with the offline casino is created at step 430. The offline account may be created based on the user contact information stored with the online account. The method of FIG. 4 may then continue to step 440.

A determination may be made as to whether loyalty credits from the offline account should be retrieved at step 440. A user may have loyalty credits for use as a patron of the casino that the user may use with the online account. If no loyalty credits should be retrieved, the method continues to step 460. If loyalty credits should be retrieved, the loyalty credits are retrieved at step 450. To retrieve the loyalty credits, the online service may contact the CMS system with the patron identifier and any required login information. The online service may first determine how many credits are available, and may then retrieve a number of available credits. In some instances, the online service may provide the user with the number of available credits, and then retrieve a number of available credits based on user input. In embodiments, a message from the online service to the CMS system may be queued if the CMS is not available. Transmission and queuing of messages from the online service to the CMS is discussed in more detail with respect to the method of FIG. 6.

A determination may be made as to whether loyalty credits should be transferred from the online account to the offline account at step 450. A user may have loyalty credits as a user of the online service which may be used as a patron of the casino. If no loyalty credits should be transferred, the method continues to step 480. If loyalty credits should be transferred, the loyalty credits are transferred at step 470. To transfer the loyalty credits, the online service may contact the CMS system with the patron identifier and any required login information. The online service may then determine how many credits are available and transmit a number of the available credits, based on user input.

A user may earn more loyalty credits online at step 480. The user may earn loyalty credits or other credits by participating in the gaming service. For example, a user may earn a loyalty point for each $10 wagered in a game provided by the online gaming service. When a user terminates an online gaming session, the online gaming account and corresponding offline account may be updated at step 490. The account update may include the number and type of games played, the loyalty points earned, and other data.

Figure 5:
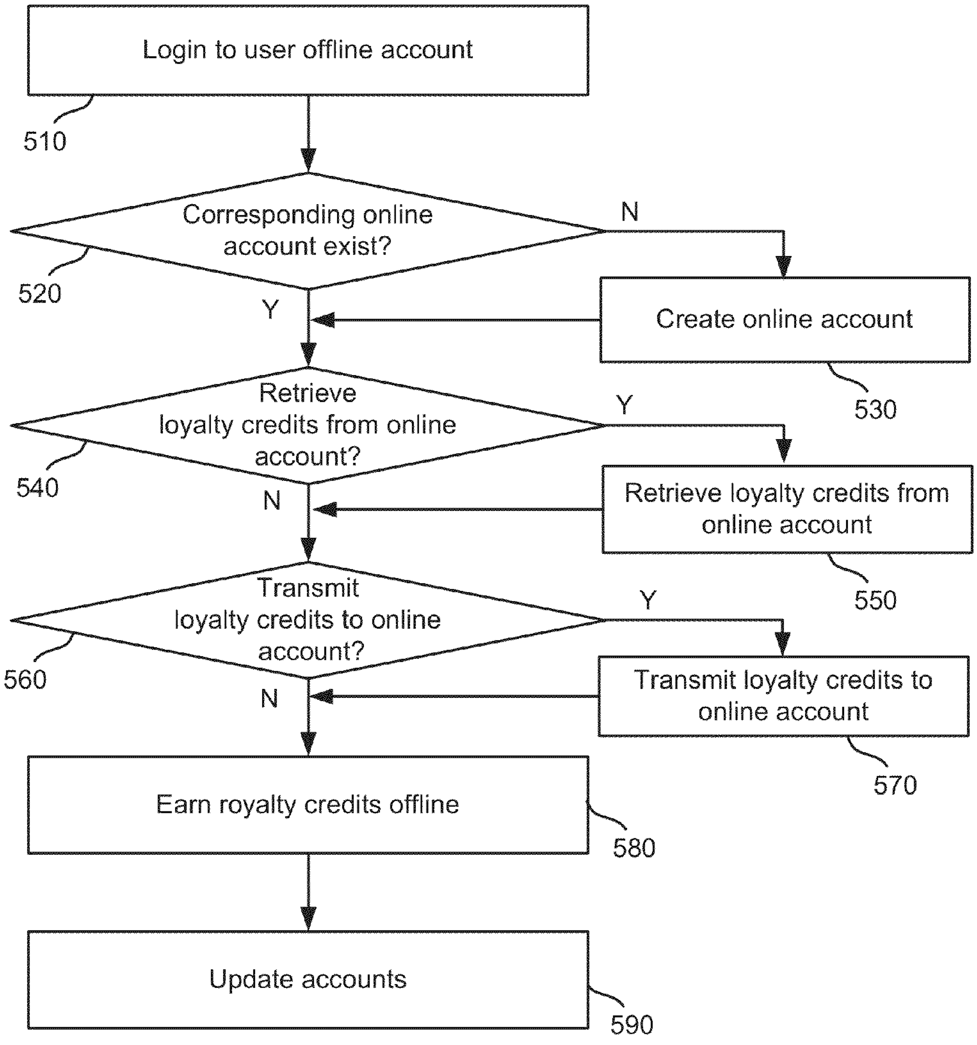
FIG. 5 is a method for accessing an online gaming account from an offline loyalty program.

FIG. 5 is a method for accessing an online gaming account from an offline loyalty program. The method of FIG. 5 may be implemented by CMS 150 of the system of FIG. 1. A patron may login to an offline account at step 510. Patron login may include providing a patron name and password, an identifier, a gaming card, or other data input to a gaming machine in a casino, which transmits the received login information to a CMS. The CMS may confirm the login information matches stored login information (or create a new account for the patron) and provide the user with actual money credit and loyalty credits on the gaming device used by the patron.

A determination may be made as to whether an online account exists for the patron at step 520. For example, an offline casino gaming device may prompt the patron to provide input to the offline service with login information for the offline service, such as a user identifier, user name or password. If the patron does have an online account with an online gaming service, the user login information for the online gaming service is received from the patron and the method continues to step 540. If the patron does not have an online account with an online gaming service provider, a user account with the online gaming service is created at step 530. The online account may be created based on the patron contact information stored with the offline account. The method of FIG. 5 may then continue to step 540.

A determination may be made as to whether loyalty credits from the online account should be retrieved by the CMS at step 540. A patron may have loyalty credits for use as a user of the online gaming service that the patron may use with the offline account. If no loyalty credits should be retrieved, the method continues to step 560. If loyalty credits should be retrieved, the loyalty credits are retrieved from the online gaming service at step 550. To retrieve the loyalty credits, the offline service may contact the online gaming service server with user login information. The offline service may first determine how many credits are available with the user's account of the online gaming service and may then retrieve a number of available credits. In embodiments, a message from the offline CMS to the online gaming service may be queued if the online service is not available. Transmission and queuing of messages from the offline CMS to the online gaming service is discussed in more detail with respect to the method of FIG. 6.

A determination may be made as to whether loyalty credits should be transferred from the offline CMS to the online gaming service at step 550. A patron may have loyalty credits as a patron of the casino facility which may be used as a user of the online gaming service. If no loyalty credits should be transferred, the method continues to step 580. If loyalty credits should be transferred, the loyalty credits are transferred at step 570. To transfer the loyalty credits, the offline CMS may contact the online gaming service with the user login information. The offline CMS may then determine how many credits are available and transmit a number of the available credits, based on patron input.

A patron may earn more loyalty credits at the casino at step 580. The patron may earn loyalty credits or other credits by participating in the casino games and other activities at the casino. For example, a patron may earn a loyalty point for each $10 wagered in a casino game. When a patron stops playing a casino game, the offline account and corresponding online gaming service may be updated at step 590. The account update may include the number and type of games played, the loyalty points earned, and other data.

Figure 6:
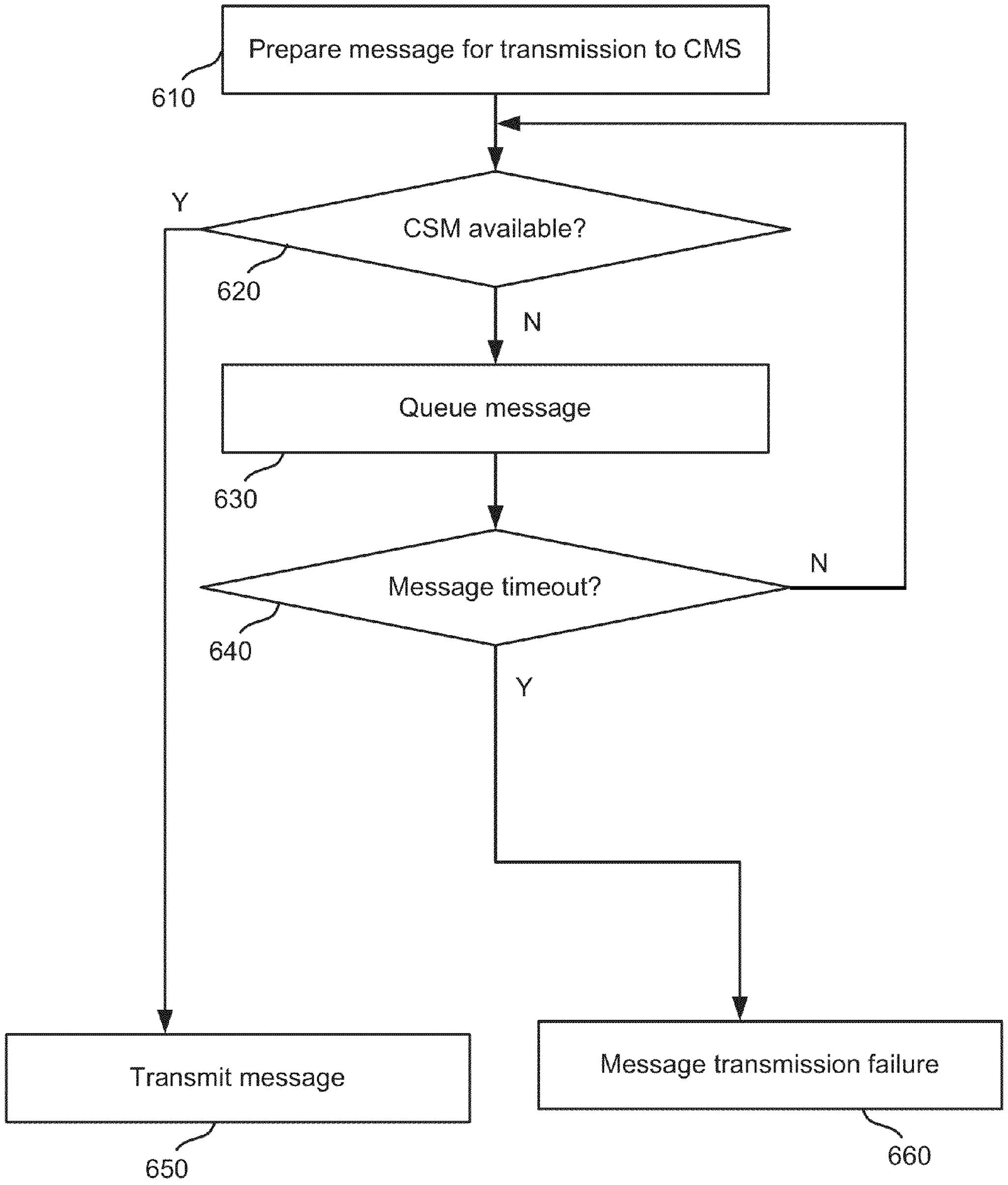
FIG. 6 is a method for communicating between an online gaming account and an offline casino management system.

FIG. 6 is a method for communicating between an online gaming account and an offline casino management system. The method of FIG. 6 may be performed at least in part by queue 132 of web server 130 of FIG. 1. Though message transmission from an online gaming service to a CMS is discussed with reference to FIG. 6, it is within the scope of the present invention to implement a similar queuing system for messages sent from CMS to an online gaming service.

A message for transmission to a CMS is prepared at step 610. A determination is then made as to whether the CMS is available at step 620. The CMS availability may be determined by pinging the CMS or sending some other message to the CMS to determine if CMS response indicates it is available to receive a message. If the CMS response indicates it is available to receive a message, the message may be sent to the CMS at step 650.

If the CMS response indicates the CMS is not available, the message may be queued at step 630. A determination may be made at step 640 as to whether the queued message has timed out. A message may have a particular time out period associated with the message, and different messages may have a different time out period. For example, a message requesting special offers offered by a particular casino may have a longer timeout period than a message requesting confirmation of a patron account. In some instances, a message may not be queued at all, for example if the message is related to a transmission of financial data—the effective timeout would be immediately. If a message timeout has expired, then the message transmission is a failure at step 660. If the message timeout has not expired, the method returns to step 620 to again determine if the CMS is available.

Figure 7:
FIG. 7 is an interface for an online gaming account.

FIG. 7 is an interface for an online gaming account. The interface of FIG. 6 provides a content page which confirms that a user having an account with an online gaming service also has an account with an offline casino. The portion of the interface highlighted by the rectangular box indicates that the user of the online service has 1000 loyalty points with a particular casino that are accessible from the online service.

Figure 8:
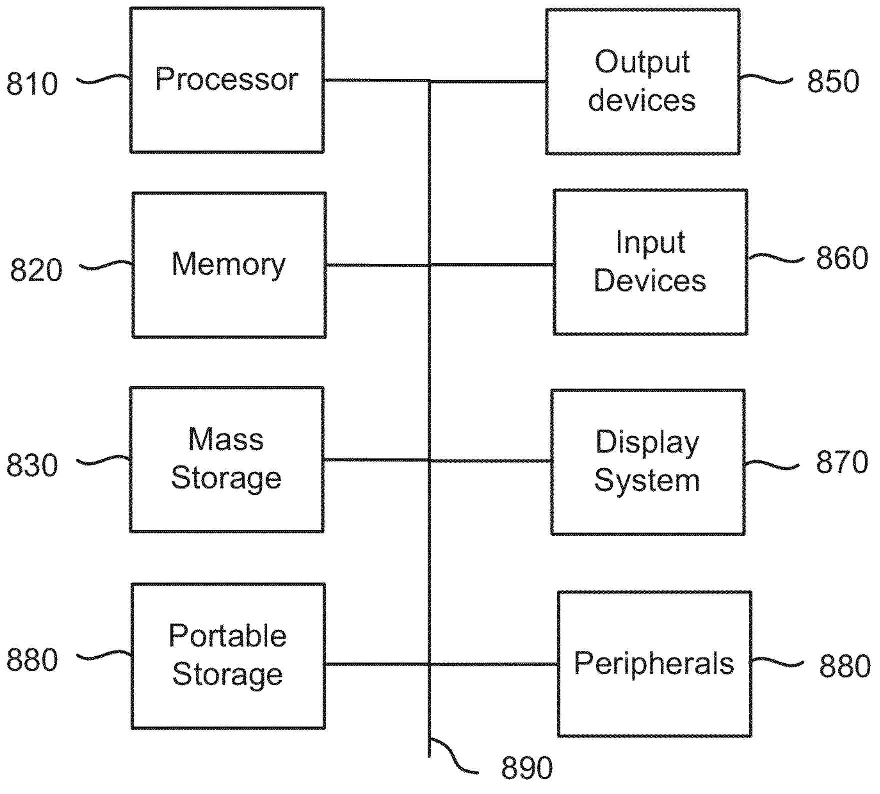
FIG. 8 illustrates an exemplary computing system that may be used to implement a computing device for use with the present technology.

FIG. 8 illustrates an exemplary computing system 800 that may be used to implement a computing device for use with the present technology. System 800 of FIG. 8 may be implemented in the contexts of the likes of application server 110, data stores 120 and 160, web server 130 and machines of CMS 150. The computing system 800 of FIG. 8 includes one or more processors 810 and memory 820. Main memory 820 stores, in part, instructions and data for execution by processor 810. Main memory 820 can store the executable code when in operation. The system 800 of FIG. 8 further includes a mass storage device 830, portable storage medium drive(s) 840, output devices 850, user input devices 860, a graphics display 870, and peripheral devices 880.

The components shown in FIG. 8 are depicted as being connected via a single bus 890. However, the components may be connected through one or more data transport means. For example, processor unit 810 and main memory 820 may be connected via a local microprocessor bus, and the mass storage device 830, peripheral device(s) 880, portable storage device 840, and display system 870 may be connected via one or more input/output (I/O) buses.

Mass storage device 830, which may be implemented with a magnetic disk drive or an optical disk drive, is a non-volatile storage device for storing data and instructions for use by processor unit 810. Mass storage device 830 can store the system software for implementing embodiments of the present invention for purposes of loading that software into main memory 820.

Portable storage device 840 operates in conjunction with a portable non-volatile storage medium, such as a floppy disk, compact disk or Digital video disc, to input and output data and code to and from the computer system 800 of FIG. 8. The system software for implementing embodiments of the present invention may be stored on such a portable medium and input to the computer system 800 via the portable storage device 840.

Input devices 860 provide a portion of a user interface. Input devices 860 may include an alpha-numeric keypad, such as a keyboard, for inputting alpha-numeric and other information, or a pointing device, such as a mouse, a trackball, stylus, or cursor direction keys. Additionally, the system 800 as shown in FIG. 8 includes output devices 850. Examples of suitable output devices include speakers, printers, network interfaces, and monitors.

Display system 870 may include a liquid crystal display (LCD) or other suitable display device. Display system 870 receives textual and graphical information, and processes the information for output to the display device.

Peripherals 880 may include any type of computer support device to add additional functionality to the computer system. For example, peripheral device(s) 880 may include a modem or a router.

The components contained in the computer system 800 of FIG. 8 are those typically found in computer systems that may be suitable for use with embodiments of the present invention and are intended to represent a broad category of such computer components that are well known in the art. Thus, the computer system 800 of FIG. 8 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

Figure 9:
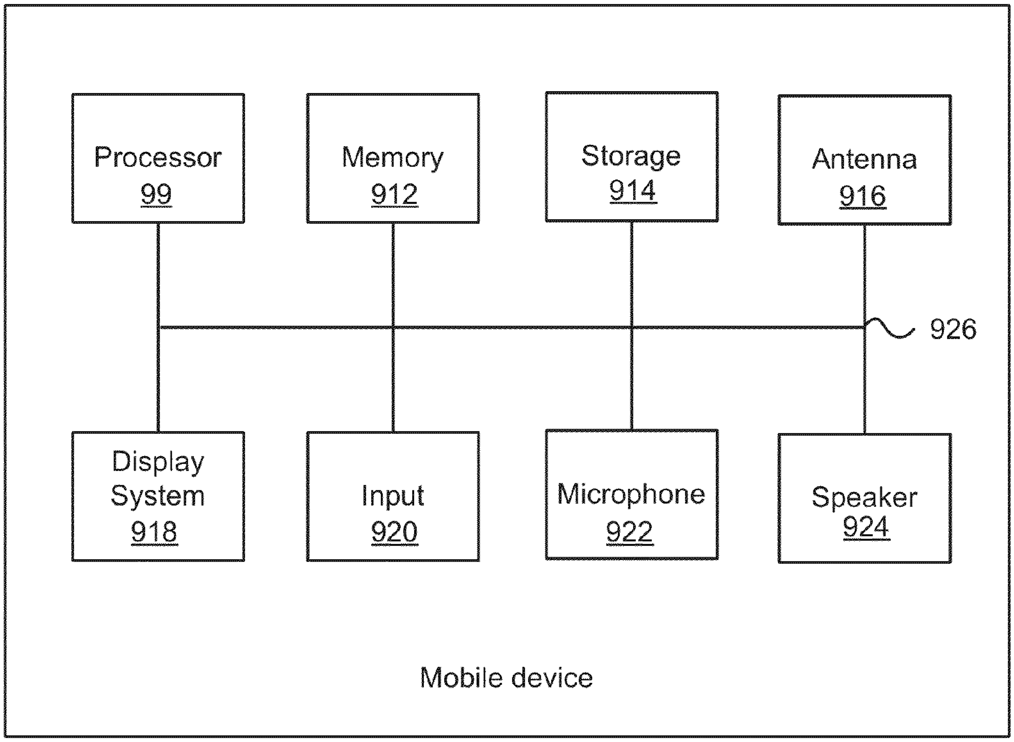
FIG. 9 illustrates an exemplary mobile device that may be used to implement the present technology.

FIG. 9 illustrates an exemplary mobile device that may be used to implement the present technology, such as for example a client device 105 implemented as a smart phone, tablet computer or other mobile device. The mobile device 900 of FIG. 9 includes one or more processors 910 and memory 912. Memory 912 stores, in part, programs, instructions and data for execution and processing by processor 910. The system 900 of FIG. 9 further includes storage 914, one or more antennas 916, a display system 918, inputs 920, one or more microphones 922, and one or more speakers 924.

The components shown in FIG. 9 are depicted as being connected via a single bus 926. However, the components 910-1024 may be connected through one or more data transport means. For example, processor unit 910 and main memory 912 may be connected via a local microprocessor bus, and storage 914, display system 918, input 920, and microphone 922 and speaker 924 may be connected via one or more input/output (I/O) buses.

Memory 912 may include local memory such as RAM and ROM, portable memory in the form of an insertable memory card or other attachment (e.g., via universal serial bus), a magnetic disk drive or an optical disk drive, a form of FLASH or PROM memory, or other electronic storage medium. Memory 912 can store the system software for implementing embodiments of the present invention for purposes of loading that software into main memory 910.

Antenna 916 may include one or more antennas for communicating wirelessly with another device. Antenna 916 may be used, for example, to communicate wirelessly via Wi-Fi, Bluetooth, with a cellular network, or with other wireless protocols and systems. The one or more antennas may be controlled by a processor 910, which may include a controller, to transmit and receive wireless signals. For example, processor 910 execute programs stored in memory 912 to control antenna 916 transmit a wireless signal to a cellular network and receive a wireless signal from a cellular network.

Display system 918 may include a liquid crystal display (LCD), a touch screen display, or other suitable display device. Display system 970 may be controlled to display textual and graphical information and output to text and graphics through a display device. When implemented with a touch screen display, the display system may receive input and transmit the input to processor 910 and memory 912.

Input devices 920 provide a portion of a user interface. Input devices 960 may include an alpha-numeric keypad, such as a keyboard, for inputting alpha-numeric and other information, buttons or switches, a trackball, stylus, or cursor direction keys.

Microphone 922 may include one or more microphone devices which transmit captured acoustic signals to processor 910 and memory 912. The acoustic signals may be processed to transmit over a network via antenna 916.

Speaker 924 may provide an audio output for mobile device 900. For example, a signal received at antenna 916 may be processed by a program stored in memory 912 and executed by processor 910. The output of the executed program may be provided to speaker 924 which provides audio. Additionally, processor 910 may generate an audio signal, for example an audible alert, and output the audible alert through speaker 924.

The mobile device system 900 as shown in FIG. 9 may include devices and components in addition to those illustrated in FIG. 9. For example, mobile device system 900 may include an additional network interface such as a universal serial bus (USB) port.

The components contained in the computer system 900 of FIG. 9 are those typically found in mobile device systems that may be suitable for use with embodiments of the present invention and are intended to represent a broad category of such mobile device components that are well known in the art. Thus, the computer system 1000 of FIG. 10 can be a cellular phone, smart phone, hand held computing device, minicomputer, or any other computing device. The mobile device can also include different bus configurations, networked platforms, multi-processor platforms, etc. Various operating systems can be used including Unix, Linux, Windows, Macintosh OS, Google OS, Palm OS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for communicating loyalty credit information, comprising:

accessing account information for a user's first account with an online gaming service, the user's first account associated with first loyalty credits;

accessing account information for a user's second account with a casino management system, the user's second account associated with second loyalty credits; and communicating loyalty credit information for the user between a server providing the online gaming service and machines providing the casino management system, wherein communicating loyalty credit information includes:

determining whether first loyalty credits from the user's first account are transferrable to the casino management system, and transmitting a number of first loyalty credits from the user's first account with the online gaming service to the user's second account with the casino management system when it is determined that the first loyalty credits are transferrable to the casino management system, wherein the number of first loyalty credits transmitted is based on available first loyalty credits in the user's first account and user input.

2. The method of claim 1, wherein accessing account information for a user's second account with a casino management system includes:

determining the user does not have a second account with the casino management system;

creating a second account with the casino management system for the user, wherein the user's second account is associated with a second loyalty credit; and accessing the user's second account.

3. The method of claim 1, wherein communicating loyalty credit information includes:

determining whether second loyalty credits from the user's second account are retrievable by the online gaming system, and retrieving a number of second loyalty credits from the user's second account with the casino management system, the number of second loyalty credits received at the user's first account with the online gaming service, when it is determined that the second loyalty credits are retrievable by the online gaming system, wherein the number of second loyalty credits retrieved is based on available second loyalty credits in the user's second account and user input.

4. The method of claim 3, wherein the second loyalty credits are retrievable by the online gaming service when the second loyalty credits are usable by the user in the user's first account with the online gaming service.

5. The method of claim 3, wherein the online gaming service communicates user identification information to the casino management system before the second loyalty credits are retrieved, and wherein the user identification information is required by the casino management system.

6. The method of claim 1, wherein the first loyalty credits are transferrable to the casino management system when the first loyalty credits are usable by the user in the user's second account with the casino management system.

7. The method of claim 1, wherein communicating loyalty credit information further includes:

determining the casino management system is not available; and queuing a message containing the loyalty credit information.

8. The method of claim 1, wherein the second loyalty credits of the user's second account with the casino management system are displayed for the user in an interface provided by the online gaming system.

9. The method of claim 1, further comprising communicating updated loyalty credit information for the user between the server providing the online gaming service and the machines providing the casino management system when the user earns additional loyalty credits.

10. The method of claim 1, wherein the casino management system communicates user login information to the online gaming service before the first loyalty credits are transmitted, and wherein the user login information is required by the online gaming service.

11. A non-transitory computer readable storage medium having embodied thereon a program, the program being executable by a processor to perform a method for communicating loyalty credit information, the method comprising:

accessing account information for a user's first account with an online gaming service, the user's first account associated with first loyalty credits;

accessing account information for a user's second account with a casino management system, the user's second account associated with second loyalty credits; and communicating loyalty credit information for the user between a server providing the online gaming service and machines providing the casino management system, wherein communicating loyalty credit information includes:

determining whether first loyalty credits from the user's first account are transferrable to the casino management system, and transmitting a number of first loyalty credits from the user's first account with the online gaming service to the user's second account with the casino management system when it is determined that the first loyalty credits are transferrable to the casino management system, wherein the number of first loyalty credits transmitted is based on available first loyalty credits in the user's first account and user input.

12. The non-transitory computer readable storage medium of claim 11, wherein accessing account information for a user's second account with a casino management system includes:

determining the user does not have a second account with the casino management system;

creating a second account with the casino management system for the user, wherein the user's second account is associated with a second loyalty credit, and accessing the user's second account.

13. The non-transitory computer readable storage medium of claim 11, wherein communicating loyalty information includes:

determining whether second loyalty credits from the user's second account are retrievable by the online gaming system, and retrieving a number of second loyalty credits from the user's second account with the casino management system, the number of second loyalty credits received at the user's first account with the online gaming service, when it is determined that the second loyalty credits are retrievable by the online gaming system, wherein the number of second loyalty credits retrieved is based on available second loyalty credits in the user's second account and user input.

14. The non-transitory computer readable storage medium of claim 13, wherein the second loyalty credits are retrievable by the online gaming service when the second loyalty credits are usable by the user in the user's first account with the online gaming service.

15. The non-transitory computer readable storage medium of claim 11, wherein the first loyalty credits are transferrable to the casino management system when the first loyalty credits are usable by the user in the user's second account with the casino management system.

16. The non-transitory computer readable storage medium of claim 11, wherein communicating information further includes:

determining the casino management system is not available; and queuing a message containing the loyalty credit information.

17. The non-transitory computer readable storage medium of claim 11, wherein the second loyalty credits of the user's second account with the casino management system are displayed for the user in an interface provided by the online gaming system.

18. A system for communicating loyalty credit information, comprising:

a server providing a web-based gaming service to a user, the server having access to a user's first account with the web-based gaming service, the user's first account associated with first loyalty credits;

a management system that manages a reward for the user, the management system associated with a gaming facility and having access to a user's second account with the management system, the user's second account associated with second loyalty credits; and one or more modules stored on a second server and executed by a processor to communicate loyalty credit information for the user between the first server and the management system, wherein communicating loyalty credit information includes:

determining whether first loyalty credits from the user's first account are transferrable to the management system, and transmitting a number of first loyalty credits from the user's first account with the web-based gaming service to the user's second account with the management system when it is determined that the first loyalty credits are transferrable to the management system, wherein the number of first loyalty credits transmitted is based on available first loyalty credits in the user's first account and user input.

19. The system of claim 18, wherein executing the one or more modules communicates loyalty credit information asynchronously between the first server and the management system.

20. The system of claim 18, wherein executing the one or more modules communicates loyalty credit information synchronously between the first server and the management system.

* * * * *